United States Patent [19]

Naujoks et al.

[11] Patent Number: 5,286,761
[45] Date of Patent: Feb. 15, 1994

[54] PROCESS FOR THE PRODUCTION OF LOW-FOG FLEXIBLE POLYESTER POLYURETHANE FOAMS AND THEIR USE IN VEHICLES

[75] Inventors: Manfred Naujoks, Burscheid; Klaus König, Odenthal; Manfred Schmidt, Dormagen; Hans-Walter Illger; Günter Baatz, both of Roesrath-Forsbach; Hansjürgen Rabe, Leverkusen, all of Fed. Rep. of Germany

[73] Assignee: Bayer Aktiengesellschaft, Leverkusen, Fed. Rep. of Germany

[21] Appl. No.: 86,489

[22] Filed: Jul. 1, 1993

[30] Foreign Application Priority Data

Jul. 13, 1992 [DE] Fed. Rep. of Germany ....... 4223014

[51] Int. Cl.$^5$ .............................................. C08G 18/14
[52] U.S. Cl. ..................................... 521/172; 521/173
[58] Field of Search ................................. 521/172, 173

[56] References Cited

U.S. PATENT DOCUMENTS

| | | | |
|---|---|---|---|
| 5,109,031 | 4/1992 | Snider | 521/172 |
| 5,145,883 | 9/1992 | Saito et al. | 521/172 |
| 5,173,518 | 12/1992 | Bott et al. | 521/172 |

Primary Examiner—Morton Foelak
Attorney, Agent, or Firm—Joseph C. Gil; N. Denise Brown

[57] ABSTRACT

Low-fog flexible polyester polyurethane foams are produced by reacting
a) polyisocyanates, with
b) polyesters containing at least two hydroxyl groups and having a molecular weight in the range from 400 to 10,000, in the presence of
c) water and/or readily volatile organic compounds as blowing agents wherein prior to reacting, the polyesters have been subjected to continuous distillation over an average holding time of 2 to 600 s, at a temperature of 160° to 250° C., and under a pressure of 0.05 to 10 mbar.

The reaction mixture may optionally contain d) compounds containing at least two active hydrogen atoms and having a molecular weight in the range from 32 to 400 as chain-extending and crosslinking agents, and/or e) auxiliaries and additives known per se.

These low-fogging polyester polyurethane foams are extremely suitable for use in vehicles, preferably automobiles.

9 Claims, No Drawings

PROCESS FOR THE PRODUCTION OF LOW-FOG FLEXIBLE POLYESTER POLYURETHANE FOAMS AND THEIR USE IN VEHICLES

BACKGROUND OF THE INVENTION

Flexible polyurethane foams are widely used for applications requiring cushioning or damping properties. A distinction is drawn between ether-based and ester-based polyurethane foams due to the differences in the polyol base.

In general, polyether polyurethane foams are further processed to mattresses and seat cushions while polyester polyurethane foams are traditionally used in automobiles.

Most (i.e. $\geq 80\%$) of the flexible polyester polyurethane foams used in automobiles are in the form of laminated sheeting in conjunction with various surface materials. These laminated sheets are widely used in seats, backrests and headrests and also in roofs.

In addition to physicochemical properties, such as elasticity, high tensile strength and tear propagation resistance, solvent resistance and tackiness on melting, there are also compelling economic and processing reasons for the use of polyester polyurethane foams for the applications mentioned above.

However, substances which escape from the polyester polyurethane foams and can lead to visible deposits on glass surfaces are increasingly being regarded by consumers as a serious drawback.

This condensation of volatile constituents from the internal trim of motor vehicles on the inner surfaces of glass windows is known as "fogging". Fogging is a light-scattering film which impairs visibility. This is particularly a problem in poor lighting conditions.

The automotive industry has attempted to eliminate these drawbacks through the use of improved basic plastics and additives. However, the problem of fogging has still not been completely solved.

Now, the process according to the invention provides flexible polyester polyurethane foams which drastically reduce the fogging effect.

DESCRIPTION OF THE INVENTION

The present invention relates to a process for the production of low-fog flexible polyester polyurethane foams comprising reacting a) polyisocyanates, with
b) polyesters containing at least two hydroxyl groups and having a molecular weight in the range from 400 to 10,000, in the presence of
c) water and/or readily volatile organic compounds as blowing agents, wherein prior to reacting b) the polyesters have been subjected to continuous distillation for an average holding time of 2 to 600 s, at a temperature of 160° to 250° C., and preferably 180° to 230° C., and under a pressure of 0.05 to 10 mbar, and preferably 0.1 to 3 mbar.

The process may additionally comprise d) compounds containing at least two active hydrogen atoms and having a molecular weight in the range from 32 to 400 as chain-extending and crosslinking agents, and
e) auxiliaries and additives known per se.

Preferred embodiments of the invention include the following:

1) distillation of the polyester in the presence of 1 to 5% by weight, based on the weight of the polyester, of an inert entraining agent having a boiling point of from 150° to 300° C.; or 2) addition to the polyesters of from 1 to 10% by weight, and preferably 3 to 6% by weight, of an entraining agent consisting of one or more diols selected from the group consisting of ethylene glycol, propylene glycol, butane-1,2- and -1,4-diol, pentane-1,5-diol, 3-methylpentane-1,5-diol, hexanediol, 2-ethylhexane-1,3-diol, diethylene glycol, triethylene glycol, dipropylene glycol, and isomer mixtures thereof; or 3) the polyester used was prepared from adipic acid, diethylene glycol, and trimethylol propane or glycerol; and the entraining agent added is diethylene glycol.

The present invention also relates to the use of the low-fog flexible polyester polyurethane foams obtainable by the processes described above in vehicles, preferably in automobiles.

Suitable starting components to be used in accordance with the invention for the production of the polyester polyurethane foams are described hereinafter.

Suitable isocyanates include those aliphatic, cycloaliphatic, araliphatic, aromatic and heterocyclic polyisocyanates of the type described, for example, by W. Siefken in Justus Liebigs Annalen der Chemie, 562, pages 75 to 136, incorporated herein by reference. These include, for example, those which correspond to the following general formula:

$$Q(NCO)_n$$

wherein n=2 - 4, preferably 2, and Q is an aliphatic hydrocarbon radical containing 2 to 18, and preferably 6 to 10 carbon atoms; a cycloaliphatic hydrocarbon radical containing 4 to 15, and preferably 5 to 10 carbon atoms; an aromatic hydrocarbon radical containing 6 to 15, and preferably 6 to 13 carbon atoms; or an araliphatic hydrocarbon radical containing 8 to 15, and preferably 8 to 13 carbon atoms.

Suitable polyisocyanates also include, for example, those of the type described in German Offenlegungsschrift 2,832,253, pages 10–11, herein incorporated by reference. In general, it is preferred to use those polyisocyanates which are readily available on an industrial scale. These include, for example, 2,4- and 2,6-tolylene diisocyanate (i.e. "TDI") and mixtures thereof; polyphenyl polymethylene polyisocyanates of the type obtained by the phosgenation of aniline-formaldehyde condensates (i.e. "crude MDI"); and carbodiimide-, urethane-, allophanate-, isocyanurate-, urea- and biuret-modified polyisocyanates ("modified polyisocyanates"). It is most preferred to use modified polyisocyanates which are derived from 2,4- and/or 2,6-tolylene diisocyanate, or from 4,4' -and/or 2,4' -diphenylmethane diisocyanate.

Polyesters which are suitable for use according to the invention include those containing at least two hydroxyl groups and having a molecular weight of from about 400 to 10,000. Compounds of this type are understood to be compounds containing, in general, 2 to 4 hydroxyl groups. It is preferred to use those having a molecular weight in the range of from 1,000 to 8,000, and preferably from 2,000 to 4,000, including, for example, compounds containing at least two, and generally two to four hydroxyl groups, of the type known per se for the production of homogeneous and cellular polyurethanes. Suitable compounds include those described, for example, in German Offenlegungschrift 2,832,253, pages 11-18, herein incorporated by reference.

In addition, it is also possible to use a polyol component comprising 50 to 99% by weight polyesters, and 2) 1 to 50% by weight, based on the weight of the polyesters, of polyethers, polycarbonates, and/or polyamides containing at least 2 hydroxyl groups and having molecular weights of from 400 to 10,000.

Suitable blowing agents include water and/or low-boiling organic compounds which known per se are in the art.

In addition to the above, it is also possible to use one or more compounds containing at least two isocyanate-reactive hydrogen atoms and having a molecular weight in the range of from 32 to 399. Suitable compounds include, for example, those which contain hydroxyl groups and/or amino groups and/or thiol groups and/or carboxyl groups. Preferred compounds are those containing hydroxyl groups and/or amino groups which serve as crosslinking agents. In general, these compounds contain from 2 to 8, and preferably from 2 to 4, isocyanate-reactive hydrogen atoms. Suitable examples of such compounds can be found in German Offenlegungschrift 2,832,253, pages 19-20, herein incorporated by reference.

Auxiliaries and additives known per se, such as, for example, emulsifiers, foam stabilizers, catalysts, and flameproofing agents, may also be optionally used. Preferred emulsifiers are those based on alkoxylated fatty acids and higher alcohols.

Suitable foam stabilizers include, for example, polyether siloxanes. It is particularly preferred to use water-soluble polyether siloxanes. Generally, these compounds have a structure in which a copolymer of ethylene oxide and propylene oxide is attached to a polydimethyl siloxane group. Foam stabilizers such as these are described, for example, in U.S. Pat. Nos. 2,834,748, 2,917,480 and 3,629,308, herein incorporated by reference. The catalysts include those known per se from polyurethane chemistry. Examples include tertiary amines and/or organometallic compounds.

Reaction retarders include those known per se. Suitable reaction retarders include, for example, compounds showing an acidic reaction, such as hydrochloric acid or organic acid halides; cell regulators known per se, such as paraffins or fatty alcohols or dimethyl polysiloxanes; pigments or dyes; stabilizers against ageing and weathering; plasticizers; fungistatic and bacteriostatic agents; and fillers, such as barium sulfate, kieselguhr, carbon black or whiting.

Additional examples of surface-active additives and foam stabilizers, cell regulators, reaction retarders, stabilizers, flameproofing agents, plasticizers, dyes, fillers, fungistatic and bacteriostatic agents which may optionally be used in accordance with the invention can be found in Kunststoff-Handbuch, Vol. VII, edited by Vieweg and Höchtlen, Carl-Hanser-Verlag, München 1966, for example, on pages 103 to 113, herein incorporated by reference. This reference also provides information on the use of these additives and the way in which they work.

The process according to the invention is carried out as described hereinafter.

A. Distillation of the polyester

Commercially available apparatus of the type widely used in the chemical industry are suitable for use in the present invention. This includes those which are commonly referred to as falling film evaporators, thin layer evaporators or short-path evaporators which are eminently suitable for carrying out the distillation step under the conditions mentioned hereinabove. Due to the relatively high viscosity of the polyesters, it is preferred to use apparatus in which the product is uniformly distributed as a thin layer on the evaporator surface by a rotor.

The polyester is heated before being continuously introduced into the evaporator. It is preferred to heat the polyester by means of heat exchangers. Generally, there is no need for further heating in the distillation apparatus. In one preferred embodiment, the polyester is distilled immediately after its production, because under normal conditions the polyester already has a temperature of 200° to 230° C. in the final stage of its production. This eliminates the need to expend more energy by reheating the polyester.

After leaving the distillation apparatus, the polyester is rapidly cooled to temperatures below 120° C.

The condenser for the distillate is generally heated to a temperature of from 50° to 70° C. The exact temperature depends on the composition of the distillate.

The effectiveness of distillation can be increased by the addition of a small quantity (i.e. from 1 to 5% by weight) of an inert solvent to the polyester prior to the distillation step. The inert solvent which acts as carrier vapor (i.e. entraining agent), should have a boiling point of from 150° to 300° C. Sulfolan, for example, has been successfully used.

In another embodiment, an entraining agent consisting of from 1 to 10% by weight, preferably 3 to 6% by weight, of one or more diols selected from the group consisting of ethylene glycol, propylene glycol, butane-1,2- and -1,4-diol, pentane-1,5-diol, 3-methyl pentane-1,5-diol, hexanediol, 2-ethylhexane-1,3-diol, diethylene glycol, triethylene glycol, dipropylene glycol, and isomer mixtures thereof, are added to the polyesters.

It is preferred to add diethylene glycol as an entraining agent to the polyester if the polyester being used is prepared from adipic acid, diethylene glycol, and trimethylol propane or glycerol.

B. Production of the foams

In accordance with the invention, the reaction components are reacted by the single-stage process known per se, the prepolymer process, or the semiprepolymer process. Machines are often used including those described, for example, in U.S. Pat. No. 2,764,565, incorporated herein by reference. The particulars of processing machines which may also be used in accordance with the invention can be found in Kunststoff-Handbuch, Vol. VII, edited by Vieweg and Höchtlen, Carl-Hanser-Verlag, München 1966, for example, on pages 121 to 205, herein incorporated by reference.

According to the invention, foaming may also be carried out in closed molds wherein the reaction mixture is introduced into a mold. Suitable mold materials include metals, for example, aluminum; or plastics, for example, epoxy resin.

The foamable reaction mixture foams in the mold and forms the molding. The in-mold foaming reaction may be carried out in such a way that the molding has a cellular structure at its surface. However, it may also be carried out in such a way that the molding has a compact skin and a cellular core. According to the invention, it is possible in this regard to introduce a foamable reaction mixture into the mold in such a quantity that the formed foam just fills the mold. However, it is also possible to introduce more foamable reaction mixture into the mold than is necessary for filling the interior of the mold with foam. This technique is known as overcharging and is described, for example, in U.S. Pat. Nos. 3,178,490 and 3,182,104, herein incorporated by reference.

"External release agents" including those known per se, such as silicone oils, are often used for in-mold foaming. However, it is also possible to use the so-called "internal release agents", which are known, such as, for example, those described in German Offenlegungschriften 2,121,670 and 2,307,589, herein incorporated by reference. In addition, these internal mold release agents may also optionally be used in admixture with external release agents.

The log-fogging polyester-based polyurethane foams produced according to the invention are extremely suitable for use in the interior of vehicles, and preferably automobiles.

It is also possible to produce foams by slabstock foaming.

The invention is further illustrated, but is not intended to be limited by the following examples in which all parts and percentages are by weight unless otherwise specified.

EXAMPLES

EXAMPLE 1

Polyester 1: a commercially available flexible foam polyester which commonly referred to as Desmophen 2200 (available from Bayer AG); produced from adipic acid, diethylene glycol and trimethylol propane; having an OH value of 61.2, an acid value of 1.4, and an average functionality of ~2.5

Polyester 1 was continuously introduced through a continuous heater (having a jacket temperature of 170° C.) at a rate of approximately 50 g per minute into a commercially available short-path evaporator (Leybold Type KDL4: material glass, evaporator surface 0.4 m, heated with heat transfer oil at 170° C., condenser temperature 70° C., operating vacuum 0.4 mbar). The average holding time was approx. 12 s. The total throughput of polyester amounted to 10 kg/3 h.

93.4 g of distillate were obtained. The OH value of the polyester had fallen to 56.3.

Foams obtained from the resulting polyester on the basis of the formulations IA, IIA and IIIA, described hereinafter, showed a distinct reduction in fogging according to DIN 75,201, method B. In particular, foams prepared using the resulting polyester showed fogging values of from 3.2 to 3.8 mg. at the corresponding densities in Table 2. These fogging values are less than those of foams prepared using conventional Desmophen 2300 in the same formulations (see Table 2).

EXAMPLE 2

The test was carried out using Polyester 1. The same procedure as described in Example 1 was followed, except the jacket temperature of the continuous heater and the short-path evaporator was 200° C. The holding time was as in Example 1 (i.e. approx. 12 s.).

| | |
|---|---|
| Distillation yield: | 146 g |
| OH value: | 55.3. |

Sample foams were prepared using the resulting polyester corresponding to the formulations set forth as IA, IIA and IIIA, described hereinafter. These foams showed considerably better fogging values (i.e. from 2 to 2.6 mg) compared to the foams prepared using Desmophen 2300 in same formulations.

EXAMPLE 3

Polyester 1 was used at the same throughput and temperature as set forth in Example 2. 1.85% by weight sulfolan (total quantity 10.95 kg) was added to the polyester before distillation.

| | |
|---|---|
| Holding time: | 25 s. |
| Distillation yield: | 416 g distillate of which 48.6% by weight consisted of sulfolan (99.9% of the quantity used). |

Sample foams prepared using the resulting polyester according to the formulations IA, IIA and IIIA showed very little fogging (i.e. 0.6 to 0.8 mg) compared to the foams prepared using conventional Desmophen 2300.

These test results clearly reflect the carrier vapor effect of the inert solvent added to the distillation process.

EXAMPLES 4 to 7

The following Examples were carried out using the same short-path evaporator as set forth in Example 1, with preliminary addition of diethylene glycol. The commercially available flexible foam polyester Desmophen 2300 (Bayer AG) of adipic acid, diethylene glycol and trimethylol propane was used.

TABLE 1

| Example | 4 | 5 | 6 | 7 | DE2300 |
|---|---|---|---|---|---|
| Addition of diethylene glycol (%) | 3 | 3 | 5 | 5 | — |
| Throughput (kg/h) | 3.07 | 3.24 | 3.26 | 3.24 | — |
| Pressure (mbar) | 0.03 | 0.7–0.9 | 0.04 | 0.8–1.0 | — |
| Temperature (C.) | 180 | 180 | 180 | 180 | — |
| Analysis after distillation: | | | | | |
| Acid value | 1.3 | 1.3 | 1.3 | 1.4 | 1.3 |
| OH value | 48.4 | 50.4 | 50.3 | 53.5 | 51.3 |
| Visc. mPas/25° C. | 23400 | 20560 | 21030 | 16720 | 21640 |

These test results reflect the advantages of adding diethylene glycol with regard to maintenance of the OH value.

Three different flexible foam samples were prepared from the polyesters of Examples 4 (i.e. examples IB, IIB, and IIIB) and 5 (i.e. examples IC, IIC, and IIIC) and were compared in regard to fogging behavior with foam samples of untreated polyester (i.e. examples IA, IIA, and IIIA). The formulations and test results are set forth hereinafter.

Production of flexible polyester polyurethane foams

The components are intensively mixed and reacted with one another in accordance with the formulations shown.

Example I A (Comparison)

| | |
|---|---|
| 100 parts by weight | polyester polyols (Desmophen 2300 (Bayer AG)), |
| 3.1 parts by weight | water |
| 1.2 parts by weight | dimethyl benzyl amine |
| 1.5 parts by weight | stabilizer SE 232 (UCC) |
| 18 parts by weight | tolylene diisocyanate (2,4/2,6 isomer in a ratio of 80:20% by weight) |
| 18 parts by weight | tolylene diisocyanate (2,4/2,6 isomer in a ratio of 65:35% by weight) |

Example II A (Comparison)

| | |
|---|---|
| 100 parts by weight | polyester polyol acc. to I A |
| 2.4 parts by weight | water |
| 1.4 parts by weight | N-methyl morpholine |
| 1.0 part by weight | dispersant EM (Bayer AG) |
| 1.0 part by weight | additive TX (Bayer AG) |
| 30 parts by weight | tolylene diisocyanate (2,4/2,6 isomer in a ratio of 80:20% by weight) |

Example III A (Comparison)

| | |
|---|---|
| 100 parts by weight | polyester polyol acc. to I A |
| 3.6 parts by weight | water |
| 1.4 parts by weight | N-methyl morpholine |
| 0.05 part by weight | Desmorapid PV (Bayer AG) |
| 2.0 parts by weight | dispersant EM (Bayer AG) |
| 1.5 parts by weight | additive TX (Bayer AG) |
| 41.1 parts by weight | tolylene diisocyanate (2,4/2,6 isomer in a ratio of 80:20% by weight) |

Example I B (Invention)

| | |
|---|---|
| 100 parts by weight | polyester acc. to Example 4 |
| 3.1 parts by weight | water |
| 1.2 parts by weight | dimethyl benzyl amine |
| 1.5 parts by weight | stabilizer SE 232 (UCC) |
| 18 parts by weight | tolylene diisocyanate (2,4/2,6 isomer in a ratio of 80:20% by weight) |
| 18 parts by weight | tolylene diisocyanate (2,4/2,6 isomer in a ratio of 65:35% by weight) |

Example II B

| | |
|---|---|
| 100 parts by weight | polyester acc. to Example 4 |
| 2.4 parts by weight | water |
| 1.4 parts by weight | N-methyl morpholine |
| 1.0 part by weight | dispersant EM (Bayer AG) |
| 1.0 part by weight | additive TX (Bayer AG) |
| 30 parts by weight | tolylene diisocyanate (2,4/2,6 isomer in a ratio of 80:20% by weight) |

Example III B

| | |
|---|---|
| 100 parts by weight | polyester acc. to Example 4 |
| 3.6 parts by weight | water |
| 1.4 parts by weight | N-methyl morpholine |
| 0.05 part by weight | Desmorapid PV (Bayer AG) |
| 2.0 parts by weight | dispersant EM (Bayer AG) |
| 1.5 parts by weight | additive TX (Bayer AG) |
| 41.1 parts by weight | tolylene diisocyanate (2,4/2,6 isomer in a ratio of 80:20% by weight) |

Example IC:

same formulation as IB, but using the polyester according to Example 5

Example IIC:

same formulation as IIB, but using the polyester according to Example 5

Example IIIC:

same formulation as IIIB, but using the polyester according to Example 5

The fogging properties of these examples are set forth hereinafter in Table 2. DIN 75,201, Method B was used to determine these properties.

Testing of the flexible polyester polyurethane foams obtained for fogging in accordance with DIN 75,201 - Method B DIN 75,201 is used to evaluate the fogging properties of materials used for the interior trim of motor vehicles. It describes two methods:

Method A — reflectometric method, residual gloss measurement

A test specimen of the material measuring 80 mm (diameter) by 10 m (thickness) is placed for 3 hours in a thermostatically controlled vessel (at 100° C.) which is sealed with a specially cleaned and likewise thermostatically controlled glass plate (20° C.).

Low molecular weight constituents which vaporize and condense at temperatures in the range of from 20° to 100° C. are deposited on the cooled glass plate. It is these deposits which reduce the degree of reflection in comparison to a zero sample.

Method B - gravimetric method

A test specimen of the same dimensions (i.e. 80 mm in diameter by 10 mm thickness) is placed in the apparatus described above in Method A for 16 hours. The condensation surface used is a cooled aluminum foil (20° C.) on which the condensed mass minus the absorbed water is determined by differential weighing.

TABLE 2

| Example | Deposit (mg) | Density (kg m$^{-3}$) |
|---|---|---|
| I A | 7.2 | 35 |
| II A | 8.5 | 44 |
| III A | 6.3 | 31 |
| I B | 0.9 | 35 |
| II B | 0.5 | 44 |
| III B | 0.5 | 31 |
| I C | 2.8 | 35 |
| II C | 3.5 | 44 |
| III C | 2.9 | 31 |

These results clearly show that low-fog flexible polyester polyurethane foams are obtained by the process according to the invention (i.e. examples IB, IIB, IIIB, IC, IIC, and IIIC).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of low-fog flexible polyester polyurethane foams comprising reacting
   a) polyisocyanates, and
   b) polyesters containing at least two hydroxyl groups and having a molecular weight in the range of from 400 to 10,000, in the presence of
   c) water and/or readily volatile organic compounds as blowing agents;

wherein prior to reacting b) said polyesters have been subjected to continuous distillation for an average holding time of 2 to 600 seconds, at a temperature of from 160° to 250° C., and a pressure of from 0.05 to 10 mbar.

2. The process of claim 1 additionally comprising
   d) compounds containing at least two active hydrogen atoms and having a molecular weight in the range from 32 to 400 as chain-extending and cross-linking agents.

3. The process of claim 1 additionally comprising
   e) auxiliaries and/or additives.

4. The process of claim 1 wherein said temperature is from 180° to 230° C.

5. The process of claim 1 wherein said pressure is from 0.1 to 3 mbar.

6. The process of claim 1, wherein said distillation of b) said polyester is carried out in the presence of an entraining agent comprising 1 to 5% by weight, based on the weight of said polyester, of an inert solvent having a boiling point of from 150° to 300° C.

7. The process of claim 6, wherein said entraining agent comprises from 1 to 10% by weight, based on the weight of said polyester, of one or more diols selected from the group consisting of ethylene glycol, propylene glycol, butane-1,2-diol, butane-1,4-diol, pentane-1,5-diol, 3-methylpentane-1,5-diol, hexanediol, 2-ethylhexane-1,3-diol, diethylene glycol, triethylene glycol, dipropylene glycol, and isomer mixtures thereof.

8. The process of claim 6 wherein said entraining agent comprises from 3 to 6% by weight, based on the weight of said polyester, of one or more diols selected from the group consisting of ethylene glycol, propylene glycol, butane-1,2-diol, butane-1,4-diol,pentane-1,5-diol, 3-methylpentane-1,5-diol, hexanediol, 2-ethylhexane-1,3-diol, diethylene glycol, triethylene glycol, dipropylene glycol, and isomer mixtures thereof.

9. The process of claim 6 wherein b) said polyester is prepared from adipic acid, diethylene glycol, and trimethylol propane or glycerol, and said entraining agent is diethylene glycol.

* * * * *